March 24, 1964    R. C. BLAIR    3,126,027
FLUID OPERATED KETTLE DISCHARGE VALVE ASSEMBLY
Filed Sept. 1, 1961    2 Sheets-Sheet 2

INVENTOR
ROBERT C. BLAIR.

3,126,027
FLUID OPERATED KETTLE DISCHARGE
VALVE ASSEMBLY
Robert C. Blair, Winnipeg, Manitoba, Canada, assignor to Western Gypsum Products Limited, Winnipeg, Manitoba, Canada
Filed Sept. 1, 1961, Ser. No. 135,544
2 Claims. (Cl. 137—243.6)

My invention relates to new and useful improvements in dump valves for calcining kettles.

Normally said valves, which are usually situated in the discharge chute, comprise a butterfly type of valve mechanically operated which, when opened, permits the discharge by gravity of the calcine gypsum which is in a semi-fluid condition. However, such valves suffer from several disadvantages, the principal one of which is the fact that even when opened, the valve acts as an obstruction to the free flow of the calcine gypsum.

Furthermore, when the valve is closed, there is a tendency of some of the calcine gypsum to be trapped between the valve and the wall of the discharge chute thus preventing an efficient closure from being obtained. This failure to close can allow uncalcined gypsum to discharge during the calcining process and mix with the main body of the calcined gypsum in the hot pit from the previous batch. Even a small quantity of uncalcined gypsum can spoil a large batch of calcined material.

By providing a cylindrical type of valve engageable within a suitable valve seat and operated longitudinally by air pressure or the like, I have overcome the first principal disadvantage and by providing means to partially rotate said valve as it engages the valve seat, I overcome the second disadvantage as the partial rotation of the valve as it engages the seat, causes a grinding action to occur which throws out any trapped ground material and ensuring that the discharge chute is completely and efficiently closed off.

Another disadvantage of the butterfly or flat type valve is that it requires considerable effort to move it from the closed to the opened position due to the load of the calcine gypsum thereupon. My cylindrical plug type valve overcomes this disadvantage as the action is longitudinal.

The principal object and essence of my invention is therefore to provide a device of the character herewithin described in which the efficient opening and closing of the discharge chute occurs.

Another object of my invention is to provide a device of the character herewithin described which, due to the grinding action between the valve head and the valve seat, eliminates the tendency of the valve to be jammed in the partially opened position.

A yet further object of my invention is to provide a device of the character herewithin described which facilitates the dumping action of the calcine gypsum as the valve draws clear of the flow.

Yet another object of my invention is to provide a device of the character herewithin described which is particularly suitable for incorporation in an automatically controlled calcining kettle operation.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
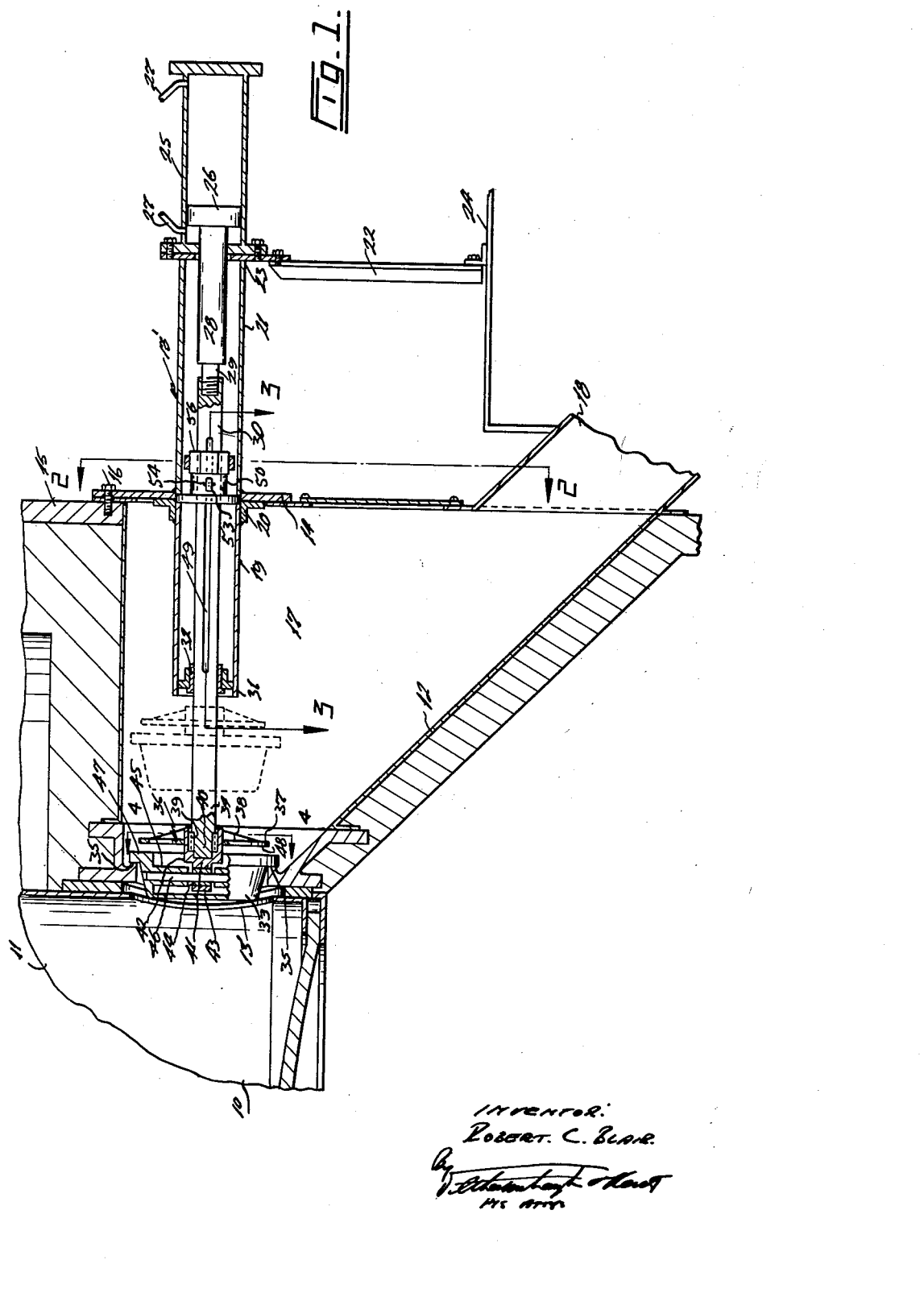
FIGURE 1 is a side elevation of my device shown in situ and sectioned to show the interior thereof.

Proceeding therefore to describe my invention in detail, reference should first be made to FIGURE 1 in which reference character 10 represents the base of a calcining kettle 11 and a discharge chute 12 secured thereto. Reference character 13 illustrates a discharge aperture within the base communicating with the discharge chute 12.

My device collectively designated 13' comprises a vertical supporting plate 14 secured to the kettle assembly 15 by means of bolt 16 and forming, together with the base 16' of the structure 15 and the chute 12, an area 17 within which the valve assembly 13' operates and being clear of the main discharge chute extension 18.

A support cylinder 19 is welded to a ring support 20 which in turn is supported by the plate 14, said support cylinder extending inwardly within the area 17. A spacer cylinder 21 is welded to the plate 14 and extending outwardly of the plate, but in alignment with the aforementioned cylinder 19.

A vertical support 22 extends from adjacent the end 23 of the cylinder 21, the lower end of the support engaging supporting structure 24 associated with the discharge chute assembly 18.

Bolted to the end 23 of the cylinder 21 is a pneumatic cylinder 25 also in alignment with cylinders 19 and 21 and a piston 26 reciprocates within the cylinder 25 actuated by pneumatic pressure from a source of fluid power (not illustrated) but routed to the cylinder 25 by means of conduits 27.

A piston rod 28 is secured to the piston 26 and screw-threadably secured to the end 29 of the piston rod, is a valve rod 30 which extends through cylinder 21, and through cylinder 19, being supported adjacent the inner end 31 of the cylinder 19 within a bearing 32 held therein.

A valve head 33 is mounted upon the inner end 34 of the valve rod 30 and is adapted to engage within a valve seat 35 surrounding the discharge aperture 13.

The mounting of this valve head is shown in detail in FIGURE 1 in conjunction with means collectively designated 36 which limit the rocking action of the valve head upon the valve rod, it being understood that the valve head is pivotally mounted to facilitate engagement of the head with the valve seat 35.

The means 36 comprises a disc 37 having strengthening webs 38 upon the rear side thereof, said disc being keyed by means 39 to the reduced end 40 of the valve rod 30. Formed upon a forward extension 41 of the disc hub 42 is an apertured lug 43 carrying a bearing 44 therein. The tapered cylindrical valve head 33 is provided with a pair of internally situated bearing shoulders 45 and a wrist pin 46 passes through these shoulders 45 and through the bearing 44 thus pivotally connecting the piston head to the piston rod in a manner similar to the attachment of a piston to a connecting rod of an automobile engine. In this connection it will be observed that the aforementioned disc 37 is secured to the rod 30 in spaced relation to the valve head 33 so that the wrist pin attachment of the head to the rod, although permitting a rocking action, has this rocking action limited by the engagement of the rear surface 47 of the valve head with the front surface 48 of the disc 37.

From the foregoing, it will be appreciated that actuation of the piston 26 will cause the valve head to reciprocate lineally into and out of engagement with the seating 35 as shown in phantom in the drawings and that any irregularities of the valve seating 35 are taken out by the rocking action permitted in the valve head attachment.

However, in order to facilitate the engagement of the head with the seating 35, I provide means whereby the head is partially rotated during engagement thus causing a grinding action between the head and the seat which eliminates any tendency of debris or the like from preventing the valve head from closing the valve seating completely.

Figure 2:
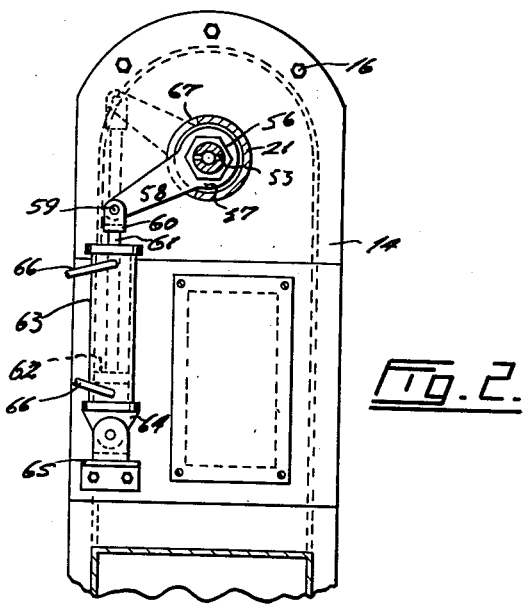
FIGURE 2 is a view substantially along the line 2—2 of FIGURE 1.
Figure 3:
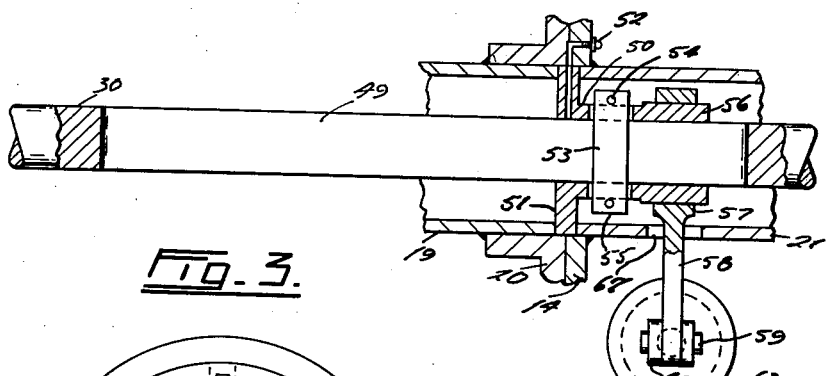
FIGURE 3 is a view substantially along the line 3—3 of FIGURE 1.
Figure 4:
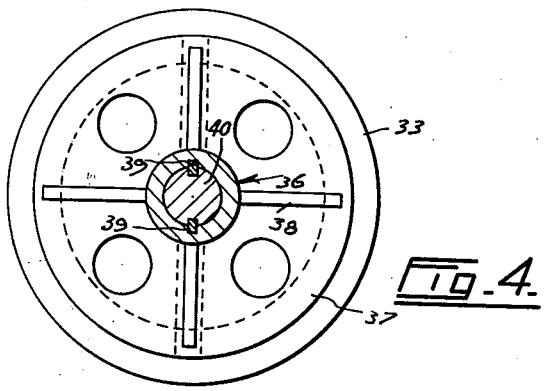
FIGURE 4 is a view of the valve head substantially along the line 4—4 of FIGURE 1.

Reference to FIGURES 2 and 3 show details of this arrangement which consists of an elongated slot 49 formed through the valve rod 30, the length of the slot being at least equal to the stroke of the piston 26.

A sleeve 50 freely surrounds the rod 30, said sleeve being provided with a flange 51 at one end thereof engageable between cylinders 19 and 21, but being capable of partial rotation therebetween. In this connection, grease nipple 52 is provided passing through the flange, to provide lubrication to the portion of the rod engageable by the sleeve 50.

A rectangular key bar 53 passes through slot 49 in rod 30 and through the walls of the sleeve 50, keepers 54 engaging the ends 55 of the key bar thus maintaining same in position.

The rear end 56 of the sleeve 50 is hexagonal when viewed from the end and a correspondingly shaped end 57 of an arm 58 engages over the hexagonal portion 56 and is secured in position by means of set screws (not illustrated).

The arm 58, which extends radially from the sleeve 50, is pivotally connected by means of pin 59 to the distal end 60 of a piston rod 61 and actuated by means of a piston 62 running within a cylinder 63 and it will be observed that this cylinder lies at right angles to the aforementioned cylinder 25. The end 64 of the cylinder is pivotally connected to a support bracket 65 extending from plate 14. Conduits 66 extend to a source of fluid power (not illustrated) and it will be observed that the arm 58 extends through an aperture 67 within the aforementioned cylinder 21. It will be apparent that reciprocation of piston 62 within cylinder 63 causes the arm 58 to reciprocate between limits as illustrated in FIGURE 2 and that due to the keeper bar 53 engaging the slot 49, the rod 30 together with the valve head 33 also reciprocates radially thus permitting the aforementioned grinding action to take place.

It will also be appreciated that the rod 30 can move lengthwise of the sleeve 50 due to the engagement of the keeper bar 53 within the slot 49 irrespective of whether piston 62 is being actuated or not.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In a fluid operated valve assembly, the combination of a valve seat, a tubular support member coaxial with but spaced from said seat, a reciprocable rod slidable in said support member and projecting outwardly therefrom, a valve head mounted on the projecting end of said rod, said valve head being engageable with and disengageable from said seat upon sliding of said rod toward and away from the seat respectively, a fluid operator secured coaxially to said support member and including a reciprocable piston rod connected to said first mentioned rod for reciprocating the same, a portion of said first mentioned rod in said support member being provided with a longitudinally extending open-sided slot, a sleeve rotatably but non-slidably positioned in said support member and having said first mentioned rod extending slidably therethrough, a transverse key carried by said sleeve and extending through said slot in said first mentioned rod whereby the latter may be turned about its axis by rotation of said sleeve in said support member, a crank secured to said sleeve and projecting radially outwardly through a recess formed in the lateral wall of the support member, a support plate secured to said support member in a plane transverse to the axis of the support member, and a fluid operator pivotally mounted on said plate and including a reciprocable piston rod connected to said crank whereby to impart turning movement to said first mentioned rod.

2. The device as defined in claim 1 wherein said valve head comprises a hub secured to the projecting end of said first mentioned rod, an axial projection integral with said hub, a transverse pivot pin carried by said projection, a rockable seat engaging member mounted on said pivot pin, and a flat disc provided on said hub in axially spaced relation from said seat engaging member, said disc providing abutment means for said seat engaging member to limit the extent of its rocking movement on said pivot pin.

References Cited in the file of this patent

UNITED STATES PATENTS

| | | |
|---|---|---|
| 895,302 | Robertson | Aug. 4, 1908 |
| 2,238,814 | Kneass | Apr. 15, 1941 |